(12) United States Patent
Kurtural

(10) Patent No.: US 9,277,695 B2
(45) Date of Patent: Mar. 8, 2016

(54) METHOD FOR TRAINING GRAPEVINE PLANTS

(71) Applicant: California State University Fresno, Fresno, CA (US)

(72) Inventor: S. Kaan Kurtural, Fresno, CA (US)

(73) Assignee: California State University, Fresno, Fresno, CA (US)

( * ) Notice: Subject to any disclaimer, the term of this patent is extended or adjusted under 35 U.S.C. 154(b) by 137 days.

(21) Appl. No.: 14/223,703

(22) Filed: Mar. 24, 2014

(65) Prior Publication Data

US 2015/0264873 A1 Sep. 24, 2015

(51) Int. Cl.
*A01G 17/02* (2006.01)
*A01G 17/00* (2006.01)

(52) U.S. Cl.
CPC .................... *A01G 17/005* (2013.01)

(58) Field of Classification Search
CPC ......... A01G 7/00; A01G 17/00; A01G 17/02; A01G 17/04; A01G 17/005; A01G 17/06; A01C 1/025; A01N 3/00
USPC ........ 47/58.1 FV, 58.1 R, 42–47, 70, 58.1 SE
See application file for complete search history.

(56) References Cited

U.S. PATENT DOCUMENTS

| | | | | |
|---|---|---|---|---|
| 1,875,561 A * | 9/1932 | Cirrito | ................. | A01G 17/005 47/58.1 R |
| 3,526,993 A * | 9/1970 | Siebol | .................... | A01G 17/06 47/46 |
| 3,585,756 A * | 6/1971 | Johnson | ................. | A01G 17/06 47/46 |
| 4,738,051 A * | 4/1988 | Dyson | .................... | A01G 17/06 47/46 |
| 5,411,561 A * | 5/1995 | Conley | ................... | A01G 17/06 47/44 |
| 5,557,883 A * | 9/1996 | Walker | ................... | A01G 17/06 47/46 |
| 5,692,339 A * | 12/1997 | Conley | ................... | A01G 17/06 47/44 |
| 5,711,109 A * | 1/1998 | Pitts | ...................... | A01G 17/02 47/46 |
| 5,797,214 A * | 8/1998 | Parrish | ................... | A01G 17/06 47/46 |
| 6,578,318 B1 | 6/2003 | Clark | | |

OTHER PUBLICATIONS http://www.omafra.gov.on.ca/english/crops/facts/info_grapeprod.htm#anchor39101 Ontario Ministry of Agriculture, Food, and Rural Affairs Wine Grape Production Outside Traditional Areas in Ontario Feb. 10, 2011 (at the bottom of the page).*
Kurtural, S.K., Wessner, L.F. Pruning Systems and Canopy Management Practice Interact on the Yield and Fruit Composition of Syrah. Am. J. Enol. Vitic. 64(1):134-138. (2013).
Kurtural, S.K., et al. Vegetative Compensation Response of a Procumbent Grapevine Cultivar under Mechanical Canopy Management. HortScience 48(5):576-583. (2013).

* cited by examiner

*Primary Examiner* — David Parsley
*Assistant Examiner* — Danielle Clerkley
(74) *Attorney, Agent, or Firm* — Grace Liu, Esq.

(57) ABSTRACT

The invention is a method of training grapevines comprising dividing fruiting canes into three horizontal zones and two vertical zones. One aspect of the present invention is a method of training grapevines having a plurality of fruiting canes comprising: separating the fruiting canes into an upper canopy and a lower canopy, then dividing the upper canopy into a first upper cane section and a second upper cane section, restraining the first upper cane section to grow along a substantially horizontal first upper wire and restraining the second upper section to grow along a substantially horizontal second upper wire, and tying the lower canopy to grow along a substantially horizontal low wire. The method of training grapevines may also comprise defining a plurality of renewal canes. The renewal canes may be down to renewal spurs. The renewal spurs may have two buds. Each of the renewal spurs may be about 2.5 cm long.

9 Claims, 2 Drawing Sheets

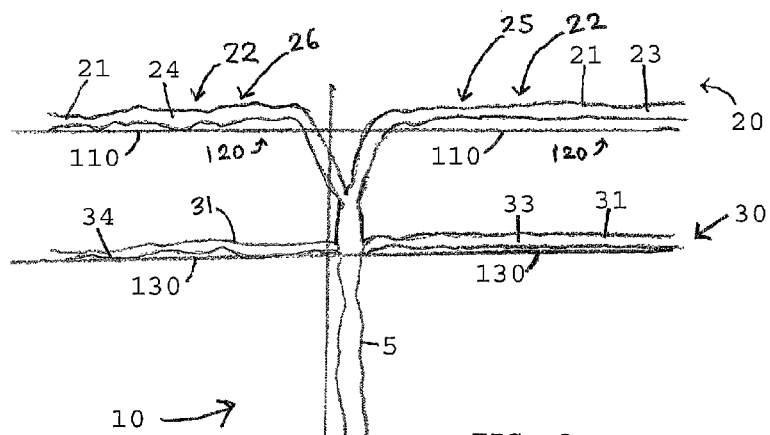
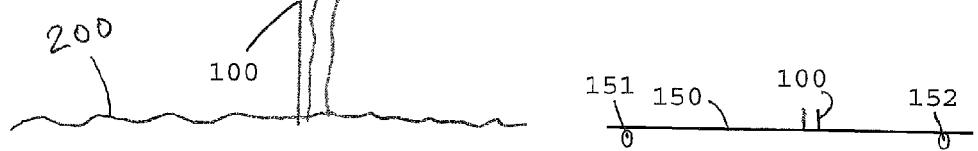
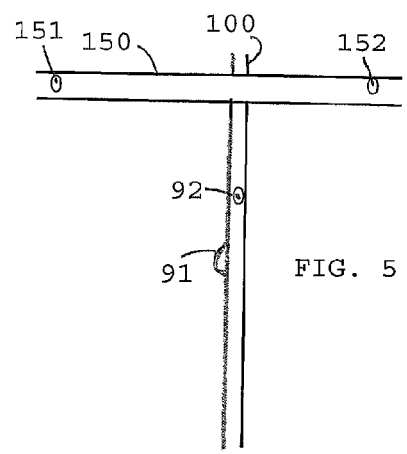
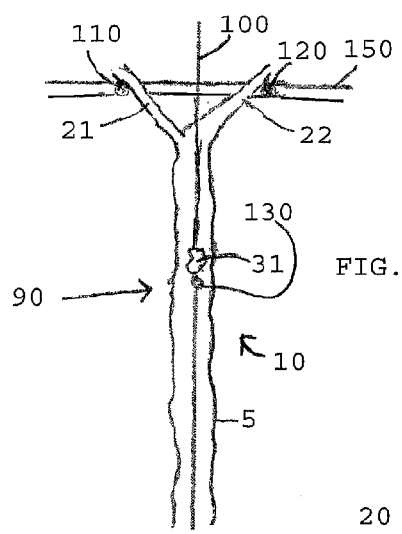
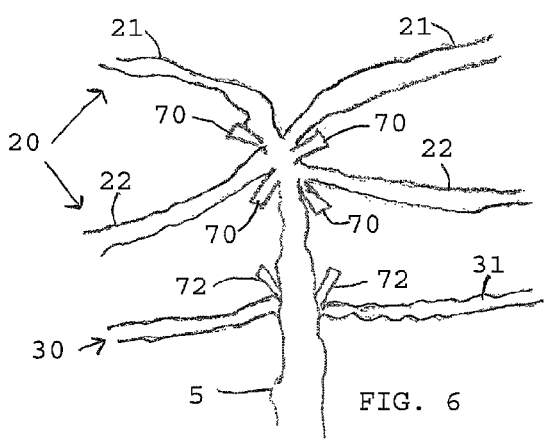

METHOD FOR TRAINING GRAPEVINE PLANTS

BACKGROUND

A. Field of the Invention

The present invention relates to a method of training a grapevine for optimal fruit yield.

B. Description of the Prior Art

As members of the *Vitis* plant family, grapevines are climbing plants that are not self-supporting, unlike most trees. While grapevines have woody trunks, the weight of a vine's leafy canopy and grape clusters will often bring the vine's canes down towards the ground unless it receives some form of support. In viticulture, growers want to prevent any part of the canes from touching the ground because of the vine's natural inclination to send out suckers or basal shoots and take root in that area where the cane is touching the ground.

Other reasons for vine training involve setting up the vineyard and each individual vine canopy for more efficient labor usage or mechanization. Vines that are trained to have their "fruiting zone" of grape clusters at waist to chest height are easier for vineyard workers to harvest without straining their bodies with excessive bending or reaching. Similarly, keeping the fruiting zone in a consistent spot on each vine makes it easier to set up machinery for pruning, spraying and harvesting.

Most commercial grapevines are trained on a trellis system to manage the growth of the grapevine and to facilitate application of water, fertilizers, and insecticides. The trellis system also enables training the grapevine in a way to admit more sunlight to the interior canes for optimal fruit bearing.

Optimal vine training systems are designed to avoid excessive shading of the fruit by the leafy growth, the canopy. While some shading is beneficial, especially in very hot and sunny climates, to prevent heat stress, excessive amounts of shading can have negative impact on grape development. As a photosynthetic plant, grapevines need access to sunlight in order to complete their physiological processes. Even if the leaves at the top of the canopy are receiving plenty of sunlight, the young buds, grape clusters and leaves below will still experience some negative impact. During the annual growth cycle of the grapevine, excessive shading can reduce the success rate of bud formation, budbreak, fruit set, as well as the size and quantity of grape berries on a cluster.

The grape clusters themselves receive some benefit from getting direct sunlight through enhance ripening of various phenolic compounds that can contribute to a wine's aroma and quality. In addition to having decreased physiological ripeness, excessive shade will negatively impact a grape's quality by causing increases in the levels of potassium, malic acid and pH in the grapes while decreasing the amount of sugar, and tartaric acid. Beyond a lack of sunlight, excessive shading limits the amount of air circulation that can take place within a vine's fruiting canopy. In wet, humid climates poor air circulation can promote the development of various grape diseases such as powdery mildew and gray rot.

U.S. Pat. No. 3,585,756 describes training young fruit bearing canes to a wire so that the canes grow horizontally along the wire. This patent describes the grapevine canes trained to curve upward so there is only one canopy layer, not multiple distinct canopy layers.

U.S. Pat. No. 5,711,109 describes training a grapevine so that the fruiting canes grow in a horizontal canopy. However, the fruiting canes are not separated into different levels.

U.S. Pat. No. 6,578,318 describes a method of raising vine plants by separating the fruiting cane portion from the renewal cane portion. The fruiting canes are placed in an upper zone, and the renewal canes are placed in a lower zone. The fruiting canes are not separated into different levels.

SUMMARY OF THE INVENTION

The present invention involves a method of training grapevines having fruiting canes comprising dividing the fruiting canes into three horizontal zones and two vertical zones. In one aspect of the present invention, the method of training grapevines having a plurality of fruiting canes comprises separating the fruiting canes into an upper canopy and a lower canopy, then dividing the upper canopy into a first upper cane section and a second upper cane section, restraining the first upper cane section to grow along a substantially horizontal first upper wire and restraining the second upper section to grow along a substantially horizontal second upper wire, and tying the lower canopy to grow along a substantially horizontal low wire. The grapevines may be Syrah grapevines.

In other aspects of the invention, the method of training grapevines can position the low wire below and between the first upper wire and the second upper wire. The low wire may be about 145 cm above the ground surface. The first upper wire and the second upper wire may be substantially parallel and about 20 cm apart. The first upper wire and the second upper wire may each be about 170 cm above ground surface.

In still other aspects of the invention, the method of training grapevines involves positioning the first upper wire on the north side of a grapevine trunk and the second upper wire on the south side of the trunk. The first upper wire and the second upper wire each may be supported by a cross member.

In another aspect of the present invention, the method of training grapevines having a plurality of fruiting canes comprises pruning said fruiting canes to create an upper cane 1, an upper cane 2, an upper cane 3, an upper cane 4 and a lower cane 1, and a lower cane 2; restraining the upper cane 1 and the upper cane 3 to grow along a substantially horizontal first upper wire and to extend away from each other, and restraining the upper cane 2 and the upper cane 4 to grow along a substantially horizontal second upper wire and to extend away from each other; and tying the lower cane 1 and the lower cane 2 to grow along a substantially horizontal low wire and to extend away from each other. The method of training grapevines may also comprise defining a plurality of renewal canes. The renewal canes may be down to renewal spurs. The renewal spurs may have two buds. Each of the renewal spurs may be about 2.5 cm long.

BRIEF DESCRIPTION OF THE DRAWINGS

FIG. 1 shows the fruiting canes divided into three horizontal zones and two vertical zones.

FIG. 3 is a side view of a grapevine plant with the fruiting canes divided into two vertical zones. The grapevine has a trunk, upper canes, and lower canes, the upper canes trained to a first upper wire and a second upper wire, and the lower canes trained to a low wire.

FIG. 4 is a front view of a grapevine plant with a trunk, two upper fruiting canes, a lower fruiting cane, one upper fruiting cane trained to a first upper wire and a second upper fruiting cane trained to a second upper wire, and the lower cane trained to a low wire. FIG. 4 shows the fruiting canes divided into three horizontal zones and two vertical zones.

FIG. 5 is a front view of a trellis, having a stake and a cross member.

FIG. 6 is a perspective view of a grapevine plant with a trunk, an upper canopy and lower canopy, and renewal canes trimmed to spurs.

DETAILED DESCRIPTION OF THE PREFERRED EMBODIMENTS

With reference to FIGS. 1-6, the preferred embodiments of the present invention are set forth. The methods of the present invention relate to a method of training grapevines, specifically Syrah grapevines. In the preferred vineyard, many grapevines are grown in parallel rows, the rows extending north-south. Each grapevine is planted between approximately 1 m and approximately 3 m, and preferably approximately 2 m, apart from each other. The rows may be situated between approximately 2 m and approximately 4 m, and preferably approximately 3 m, apart from each other.

A. Definitions

The term "grapevine" as used herein defines any plant upon which produces clusters of grapes.

The term "fruiting canes" as used herein defines the canes which bear grape clusters during any given season.

The term "renewal canes" as used herein defines the canes which do not bear grape clusters during any given season but, instead, are prepared to bear fruit in the following season.

The term "pruning" as used herein may be used interchangeably with the following terms: cutting, trimming, and clipping.

B. Description of the Grapevine Training Method

Figure 1:
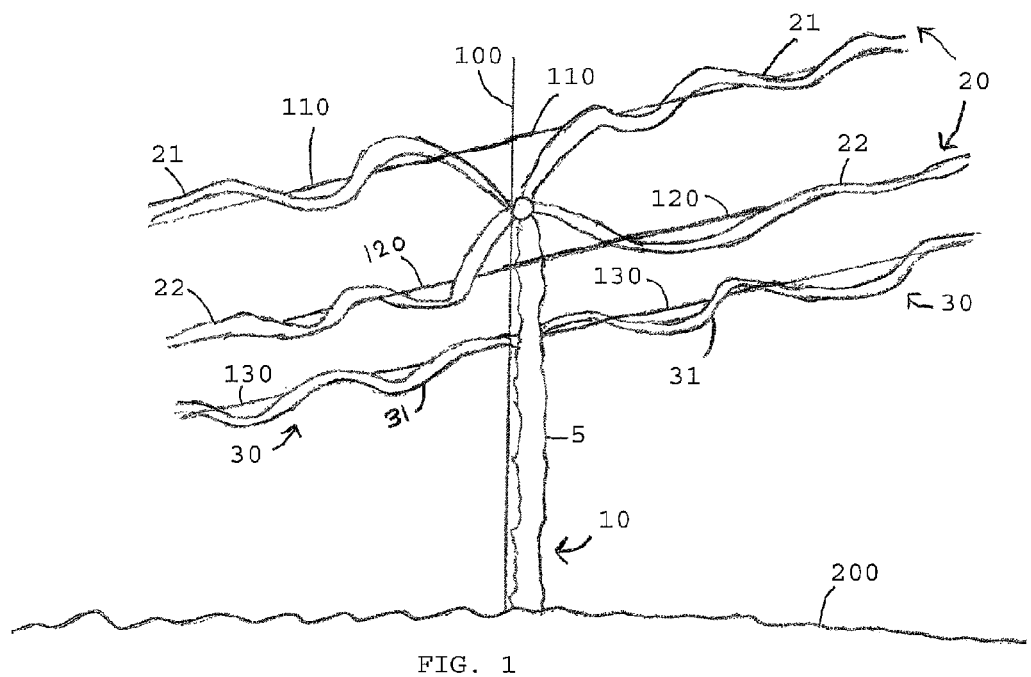
FIG. 1 is a perspective view of a grapevine plant with a trunk, an upper canopy and lower canopy, the upper canopy trained to a first upper wire and a second upper wire, and the lower canopy trained to a low wire.

The invented method of training a grapevine with fruiting canes divides the fruiting canes into three horizontal zones and two vertical zones. As shown in FIG. 1, grapevine 10 has trunk 5 fixed to stake 100. Trunk 5 extends upwardly from ground surface 200. Fruiting canes grow out of portions of trunk 5. Grapevine 10 has multiple fruiting canes, divided into two canopies, upper canopy 20 and lower canopy 30. Upper canopy 20 is one vertical zone and lower canopy 30 is the second vertical zone.

Upper canopy 20 is divided into first upper cane section 21 and second upper cane section 22. First upper cane section 21 may be restrained to grow along substantially horizontal first upper wire 110. Second upper cane section 22 may be restrained to grow along substantially horizontal second upper wire 120. Lower canopy 30 may comprise lower canes 31 that may be tired to grow along substantially horizontal low wire 130. First upper cane section 21 is one horizontal zone. Lower canes 31 comprise the second horizontal zone. Second upper cane section 22 is the third horizontal zone.

Figure 2:
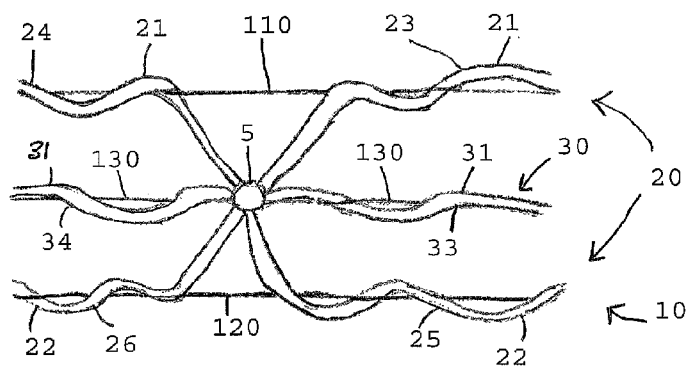
FIG. 2 is a top view of a grapevine plant showing the fruiting canes divided into three horizontal zones. The grapevine has a trunk, two upper canes trained to first upper wire, two upper canes trained to a second upper wire, and two lower canes trained to a low wire.

A trellis structure supports grapevine 10. Low wire 130 may be about 145 cm above ground surface 200. Low wire 130 is below and between first upper wire 110 and second upper wire 120 by about 25 cm. In one embodiment first upper wire 110 and second wire 120 are situated above ground surface 200 by about 170 cm. As shown in FIG. 2, first upper wire 110 and second upper wire 120 are substantially parallel. First upper wire 110 and second upper wire 130 are between about 15 cm and about 30 cm apart from each other, preferably about 20 cm apart from each other.

Also shown in FIG. 2, upper canopy 20 comprises first upper cane section 21 and first upper cane section 22. Lower canopy 30 comprises lower canes 31. Low wire 130 is centered below and between first upper wire 110 and second upper wire 120. First upper wire 110 is on the north side of trunk 5 and second upper wire 120 is on south side of trunk 5. First upper wire 110 supports first upper cane section 21 on the north side of trunk 5. Second upper wire 120 supports second upper cane section 22 on the south side of trunk 5. Low wire 130 supports lower canes 31 and extends east and west with reference to trunk 5.

First upper cane section 21, first upper cane section 22, and lower canes 31 are all fruiting canes. First upper cane section 21 on north side of trunk 5 comprises two portions: first upper east portion 23 and first upper west portion 24, both of which are supported by first upper wire 110. Second upper cane section 22 on south side of trunk 5 comprises two portions: second upper east portion 25 and second upper west portion 26, both of which are supported by second upper wire 120. Lower canes 31 comprise two portions lower east portion 33 and lower west portion 34, both of which are supported by low wire 130.

As shown in FIG. 3, first upper cane section 21 and second upper cane section 22 are substantially parallel and each at approximately the same height with reference to ground surface 200. This is because first upper wire 110 and second upper wire 120 are substantially parallel and at approximately the same height with reference to ground surface 200. First upper cane section 21 is supported by first upper wire 110. Second upper cane section 22 is supported by second upper wire 120. In one embodiment, first upper cane section 21 and second upper cane section 22 may be about 170 cm above ground surface 200. Lower canes 31 may be about 25 cm below first upper cane section 21 and second upper cane section 22. Lower canes 31 are supported by low wire 31. As shown in FIGS. 2 and 3, first upper cane section 21 comprises two portions, first upper east portion 23 and first upper west portion 24. Second upper cane section 22, comprises two portions, second upper east portion 25 and second upper west portion 26. Lower canes 31 comprise two portions lower east portion 33 and lower west portion 34.

This preferred method of training grapevines ensures that the fruiting canes are all experiencing maximum sunlight so the fruit yield is maximized. As shown in FIG. 2, the fruiting canes are separated horizontally into three zones. As shown in FIG. 3, the fruiting canes are separated vertically into two canopies or zones.

As shown in FIG. 4, grapevine 10 is supported by trellis 90, which comprises stake 100 and cross member 150. Stake 100 supports trunk 5. First upper wire 110 and second upper wire 120 are supported by cross member 150. In one embodiment, there are holes in cross member 150 through which first upper wire 110 and second upper wire 120 extend. First upper wire 110 supports first upper cane section 21. Second upper wire 120 supports second upper cane section 22. Low wire 130 is supported by stake 100. Low wire 130 supports lower canes 31. In one embodiment, there is a clip situated on stake 100 through which low wire 130 extends. In another embodiment, there is a hole in stake 100 through which low wire 130 extends. Each trellis 90 supports one grapevine 10. Each trellis 90 is planted along a grapevine row, and spaced between approximately 1 m and approximately 2 m apart.

As shown in FIG. 5, stake 100 supports the trunk by having clip 91 mounted to stake 100 that also clips around the grapevine trunk. Clip 91 may be secured to stake 100 by any means reasonable, i.e., clamping to a metal stake, or nailing on a wooden stake, drilling a hole through the stake. Stake 100 also supports low wire 130. In one embodiment, stake 100 has hole 92 through which low wire 130 passes. Cross member 150 supports first upper wire 110 (not shown) and second upper wire 120 (not shown). In one embodiment, cross member 150 may have hole 151 through which first upper wire 110 (not shown) passes. Cross member 150 also may have hole 152 through which second upper wire 120 (not shown) passes. In other embodiments, cross member 150 may support first upper wire 110 and second upper wire 120 by means of clips or ties.

On a grapevine, each year, several canes are selected as renewal canes instead of as fruiting canes. These renewal canes will be pruned into renewal spurs, with the expectation that these renewal spurs will grow into the fruiting canes in the next growing season As shown in FIG. 6, the present manner of training grapevines also involves an innovative manner of pruning renewal canes into renewal spurs. On upper canopy 20, four canes are chosen as renewal canes instead of as fruiting canes. On upper canopy 20, four renewal canes may be pruned into renewal spurs. In one embodiment, there may be four upper canopy renewal spurs 70. On lower canopy 30, two canes are chosen as renewal canes instead of as fruiting canes. On lower canopy, 30, two renewal canes may be pruned into renewal spurs. In one embodiment, there may be two lower canopy renewal spurs 72. Upper canopy renewal spurs 70 and lower canopy renewal spurs 72 each may be about 2.5 cm in length. Each renewal spur may have two buds.

B. Setting Up the Grapevine Training Method

This grapevine training method was set up in the San Joaquin Valley in Central California on a Syrah 05/SO4 grape vineyard. The research site was located in Kern County, Calif. (35° 00.322'N; 118° 53.808'W, elevation 137 m). The Syrah grapevines were planted in 1999 on Premier sandy-loam soil, a coarse-loamy, mixed, superactive, calcareous thermic Xeric Torriorthent soil, described as a deep, well-drained soil formed in alluvium from granite rocks.

Grapevines were grown in north-south parallel rows, with individual grapevine plants located either east or west of each other. The grapevines were planted 2.3 m apart from each other. The rows were located 3.4 m apart from each other and extended north-south throughout a vineyard, with each row equidistantly spaced from the others. The trellises are set up so that each trellis stake supports one grapevine trunk and the trellis cross member supports wires which support the fruiting canes from each grapevine. The grapevine plants are located about 1 m to about 2 m apart. Therefore, the trellises are also set up so that the stakes are about 1 m to about 2 m apart.

After the grapevines have grown for two years, the grapevines are ready for training. In January, the grapevine trunks are secured to the trellises by means of a clip or a tie. In April, the upper canopy fruiting canes and the lower canopy fruiting canes are defined and separated from each other. The grapevines were trained to a bilateral cordon at 1.35 m from the ground surface, with two high foliage support wires at 1.70 m from the ground surface and one low foliage support wire at about 1.45 cm from the ground surface. The two high foliage support wires are about 20 cm apart from each other. The cross member from each trellis supported the high foliage support wires and the trellis stake supported the low foliage support wire.

As shown in FIGS. 1-4, the upper canopy canes are divided into first upper cane section 21 and second upper cane section 22. The first upper cane section 21 is tied to first upper wire 110 and second upper cane section 22 is tied to second upper wire 120. The lower canopy canes are defined as lower canes 31 and are tied to low wire 130.

During the month of April, the renewal canes are defined and trimmed into renewal spurs. By May, the grapevine has fruiting canes and renewal spurs, as shown in FIG. 6. Throughout the months of May through October, grapevine 10 grows fruit while its canes are trained as shown in FIGS. 1-4.

C. Advantages to Grapevine Training Method Invention

This method has tremendous advantages in exposing the fruiting canes to maximum amounts of sunlight. The fruiting canes are divided into three separate horizontal zones, as shown in FIG. 2. The fruiting canes are divided into two separate vertical zones as shown in FIG. 3. The fruiting canes produce more fruit compared to the traditional grapevine training method.

The traditional grapevine training method trains a grapevine's fruiting canes all in one vertical zone, and only two horizontal zones. The one vertical level is between about 135 cm and about 170 cm above the ground surface. One horizontal zone is on the north side of the grapevine trunk, extending east-west. The second horizontal zone is on the south side of the grapevine trunk extending east-west.

One year after implementation of the novel grapevine training method, yield at the vineyard increased steadily to 22 tons/ha. The yield increased to 26.2 tons/ha by the second year after implementation. The fruit yields from grapevines trained in the traditional training method in the same vineyard in the same years were 16.8 tons/ha in the first year, and 12.8 tons/ha in the second year. When the grapevines in the same vineyard did not have their fruiting zones separated into three horizontal zones and two vertical zones, the grapevines in the same vineyard produced less yield. Table 1 shows the difference in yield between traditional non-separation

TABLE 1

Comparison of Fruit Yield Between Grapevines Trained with the Traditional Training Method and Grapevines Trained with the Claimed Training Method

|  | Fruit Yield in Grapevines Trained with the Traditional Training Method (tons/ha) | Fruit Yield in Grapevines Trained with the Claimed Training Method (tons/ha) |
| --- | --- | --- |
| Year 1 | 16.8 | 22 |
| Year 2 | 12.8 | 26.2 |

A number of embodiments of the invention have been described. Nevertheless, it will be understood that various modifications may be made without departing from the spirit and scope of the invention. Accordingly, other embodiments are within the scope of the present invention.

I claim:

1. A method of training a grapevines having a trunk and fruiting canes consisting:
   defining a northside and a southside for said grapevine;
   ensuring only six fruiting canes grow from said trunk;
   separating said six fruiting canes into an upper canopy and a lower canopy, wherein said upper canopy consists of four fruiting canes and said lower canopy consists of two fruiting canes;
   dividing said upper canopy into a first upper cane section consisting of two fruiting canes and a second upper cane section consisting of two fruiting canes;
   establishing a first upper wire on said northside, a second upper wire on said southside, and a low wire;

restraining said first upper cane section to grow along said first upper wire and restraining said second upper section to grow along said second upper wire; and tying said lower canopy to grow along said low wire.

2. A method of training a grapevine according to claim 1, wherein said low wire is below and between said first upper wire and said second upper wire.

3. A method of training a grapevine according to claim 1, wherein said low wire is about 145 cm above ground surface.

4. A method of training a grapevine according to claim 1, wherein said first upper wire and said second upper wire are substantially parallel and about 20 cm apart.

5. A method of training a grapevine according to claim 1, wherein said first upper wire and said second upper wire are each about 170 cm above ground surface.

6. A method of training a grapevine according to claim 1, wherein said first upper wire and said second upper wire are each supported by a cross member.

7. A method of training a grapevine according to claim 1, wherein said grapevine is a Syrah grapevine.

8. A method of training a grapevines consisting:

defining a northside and a southside for said grapevine;

pruning said grapevine to have only six fruiting canes, wherein said six fruiting canes consist of an upper cane 1, an upper cane 2, an upper cane 3, an upper cane 4 and a lower cane 1, and a lower cane 2;

establishing a first upper wire on said northside, a second upper wire on said southside, and a low wire;

restraining said upper cane 1 and said upper cane 3 to grow along said first upper wire and to extend away from each other, and restraining said upper cane 2 and said upper cane 4 to grow along said second upper wire and to extend away from each other; and tying said lower cane 1 and said lower cane 2 to grow along said low wire and to extend away from each other.

9. A method of training a grapevine according to claim 8, wherein said grapevine is a Syrah grapevine.

\* \* \* \* \*